United States Patent
Blackburn et al.

(10) Patent No.: US 10,720,266 B2
(45) Date of Patent: Jul. 21, 2020

(54) SHAPE RETAINING CABLE ASSEMBLY

(71) Applicant: TE CONNECTIVITY CORPORATION, Berwyn, PA (US)

(72) Inventors: Christopher William Blackburn, Bothell, WA (US); Kyle Robert Sammon, Lancaster, PA (US); Jared Evan Rossman, Dover, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/939,476

(22) Filed: Mar. 29, 2018

(65) Prior Publication Data

US 2019/0304629 A1 Oct. 3, 2019

(51) Int. Cl.
*H01B 7/04* (2006.01)
*H01B 7/40* (2006.01)

(52) U.S. Cl.
CPC .............. *H01B 7/40* (2013.01); *H01B 7/04* (2013.01)

(58) Field of Classification Search
None
See application file for complete search history.

(56) References Cited

U.S. PATENT DOCUMENTS

| | | | |
|---|---|---|---|
| 4,165,559 A | 8/1979 | Lang et al. | |
| 4,463,779 A | 8/1984 | Wink et al. | |
| 5,386,489 A | 1/1995 | Stokes | |
| 5,461,200 A * | 10/1995 | Norcia | F16L 11/121 174/135 |
| 5,577,932 A * | 11/1996 | Palmer | H01B 7/06 206/702 |
| 6,137,936 A * | 10/2000 | Fitz | G02B 6/4422 385/100 |
| 6,566,606 B1 * | 5/2003 | Hazy | H01B 11/1091 174/113 R |
| 7,310,472 B2 | 12/2007 | Haberman | |
| 7,310,473 B2 | 12/2007 | Haberman | |
| 8,816,202 B2 * | 8/2014 | Burton | H01R 25/003 174/135 |
| 9,461,449 B2 * | 10/2016 | Murray | H02G 3/0487 |
| 2005/0274425 A1 * | 12/2005 | Ostrander | F16L 11/121 138/144 |
| 2008/0008430 A1 * | 1/2008 | Kewitsch | G02B 6/4478 385/113 |
| 2012/0241195 A1 * | 9/2012 | Doll | H04R 1/1033 174/135 |
| 2015/0083904 A1 * | 3/2015 | Cooper | G01L 1/242 250/256 |

(Continued)

*Primary Examiner* — Dimary S Lopez Cruz

(57) ABSTRACT

A cable assembly includes a cable including a wire and an insulator surrounding the wire extending a length between a first end and a second end and being conductive, where the wire having a first stiffness. The cable assembly includes a sleeve surrounding the cable between the first end and the second end having an interior surface facing the cable and an exterior surface facing an exterior environment of the cable assembly. The cable assembly includes a cable stiffener coupled to the sleeve extending along at least a portion of the length of the cable. The cable stiffener is formable into shape retaining shape and has a second stiffness greater than the first stiffness to hold the cable in the shape retaining shape.

20 Claims, 3 Drawing Sheets

(56) References Cited

U.S. PATENT DOCUMENTS

2015/0367094 A1* 12/2015 Hingley ................ B29C 65/64
            600/112
2016/0172076 A1* 6/2016 Hess .................... H01B 1/026
            385/100

* cited by examiner

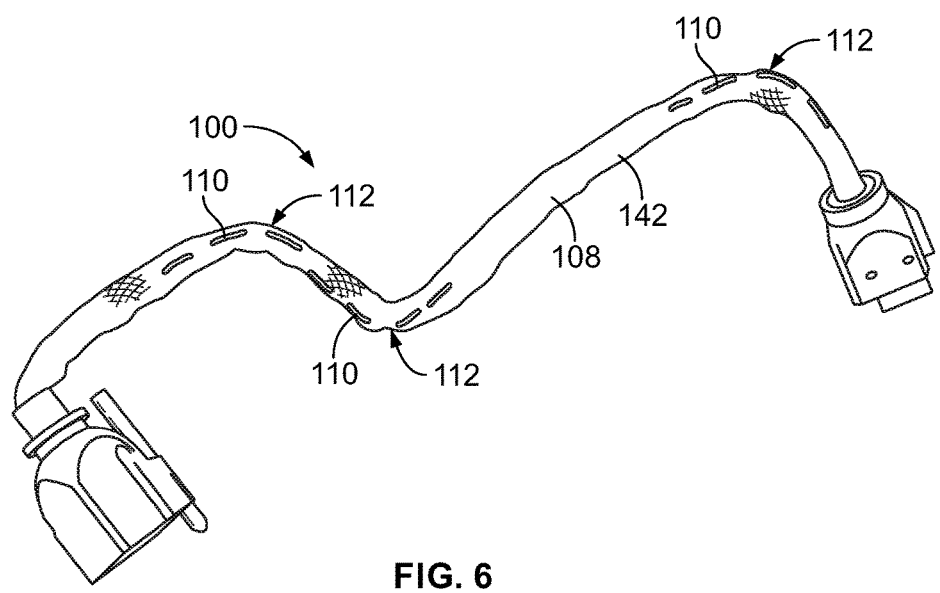
FIG. 6
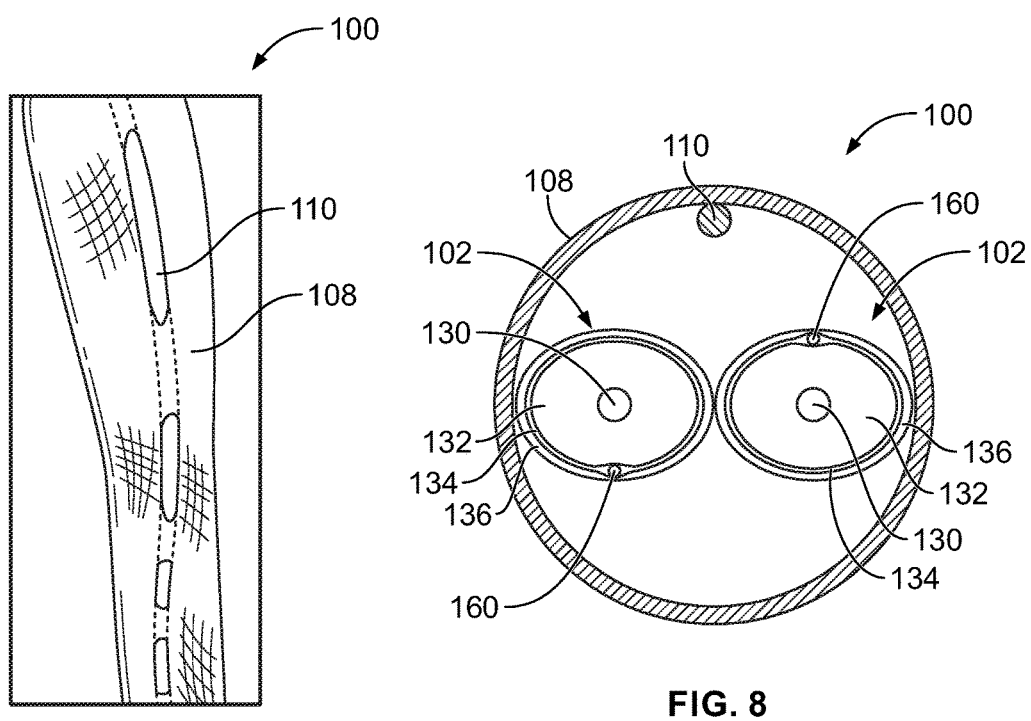
FIG. 7
FIG. 8

SHAPE RETAINING CABLE ASSEMBLY

BACKGROUND OF THE INVENTION

The subject matter herein relates generally to cable assemblies.

Cable assemblies are used in connector systems to electrically connect various components. The cable assemblies include one or more cables that are routed between the various components. The cables may be routed around or between other components, such as through boxes, panels, walls, around other cables and the like. Some known cable assemblies include sleeves that surround the cables to secure the cables in a safe environment away from damage, dust debris and the like. The sleeve is bendable with the cables and routable with the cables between the components and around other components within the system.

In some systems, the cables are bent and manipulated around various components. The cables do not tend to hold their shape and tend to straighten over time, pressing against the other components or generally working themselves out of position over time.

A need remains for a cable assembly configured to retain shape over time that may be manufactured in a cost effective and reliable manner.

BRIEF DESCRIPTION OF THE INVENTION

In one embodiment, a cable assembly is provided including a cable including a wire and an insulator surrounding the wire extending a length between a first end and a second end and being conductive, where the wire has a first stiffness. The cable assembly includes a sleeve surrounding the cable between the first end and the second end having an interior surface facing the cable and an exterior surface facing an exterior environment of the cable assembly. The cable assembly includes a cable stiffener coupled to the sleeve extending along at least a portion of the length of the cable. The cable stiffener is formable into a shape retaining shape and has a second stiffness greater than the first stiffness to hold the cable in the shape retaining shape.

In another embodiment, a cable assembly is provided including a cable including a wire and an insulator surrounding the wire extending a length between a first end and a second end and being conductive, where the wire having a first stiffness. The cable assembly includes a sleeve surrounding the cable and extending the entire length between the first end and the second end having an interior surface facing the cable and an exterior surface facing an exterior environment of the cable assembly. The cable assembly includes a cable stiffener coupled to the sleeve extending along at least a portion of the length of the cable. The cable stiffener is formable into a shape retaining shape and has a second stiffness greater than the first stiffness to hold the cable in the shape retaining shape.

In another embodiment, a cable assembly is provided including a cable including a wire and an insulator surrounding the wire extending a length between a first end and a second end. The cable has a first bend and a second bend remote from each of the first end and the second end and remote from each other. The wire is conductive and the wire has a first stiffness. The cable assembly includes a sleeve surrounding the cable between the first end and the second end having an interior surface facing the cable and an exterior surface facing an exterior environment of the cable assembly. The cable assembly includes a cable stiffener coupled to the sleeve. The cable stiffener has a first portion extending along the first bend and a second portion extending along the second bend. The first portion is separate and discrete from the second portion. The cable stiffener is formable into a shape retaining shape. The cable stiffener has a second stiffness greater than the first stiffness to hold the cable in the shape retaining shape.

BRIEF DESCRIPTION OF THE DRAWINGS

FIG. 6 is a perspective view of the cable assembly in accordance with an exemplary embodiment.

FIG. 7 is a perspective view of a portion of the cable assembly in accordance with an exemplary embodiment.

FIG. 8 is a cross-sectional view of the cable assembly in accordance with an exemplary embodiment.

DETAILED DESCRIPTION OF THE INVENTION

Figure 1:
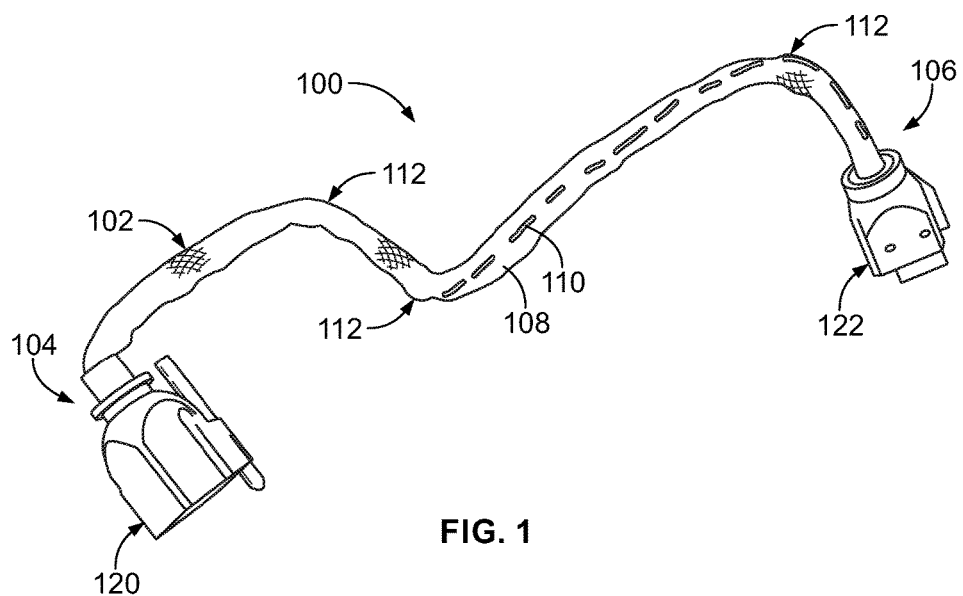
FIG. 1 is a perspective view of a cable assembly in accordance with an exemplary embodiment.

FIG. 1 is a perspective view of a cable assembly 100 in accordance with an exemplary embodiment. The cable assembly 100 includes a cable 102 extending a length between a first end 104 and a second end 106. The cable assembly 100 includes a sleeve 108 surrounding the cable 102 between the first and second ends 104, 106.

The cable assembly 100 includes a cable stiffener 110 coupled to the sleeve 108. The cable stiffener 110 extends along at least a portion of the length of the cable 102. The cable stiffener 110 is formable into a shape retaining shape to hold the cable 102 in the formed shape. For example, the cable 102 may have one or more bends 112, such as for routing around other components within a system. The cable stiffener 110 may have a first portion extending along a first of the bends 112 and a second portion, separate and discrete from the first portion, extending along a second of the bends 112 and/or may include additional portions extending along additional bends 112. The cable stiffener 110 holds the cable 102 in the bent shape, such as for cable maintenance within the system. Optionally, the cable assembly 100 may be pre-bent, and held in the predetermined shape by the cable stiffener 110, prior to loading into the system. The cable stiffener 110 may be a metal wire, a metal bar, or another metal element capable of retaining shape. In other various embodiments, the cable stiffener 110 may be non-metal, such as a stiff plastic material capable of retaining shape.

In an exemplary embodiment, the cable assembly 100 includes a first connector 120 at the first end 104 and a second connector 122 at the second end 106. The cable 102 is electrically connected to the first and second connectors 120, 122. The first and second connectors 120, 122 are configured to be electrically connected to corresponding connectors or components within the system.

Figures 2, 3:
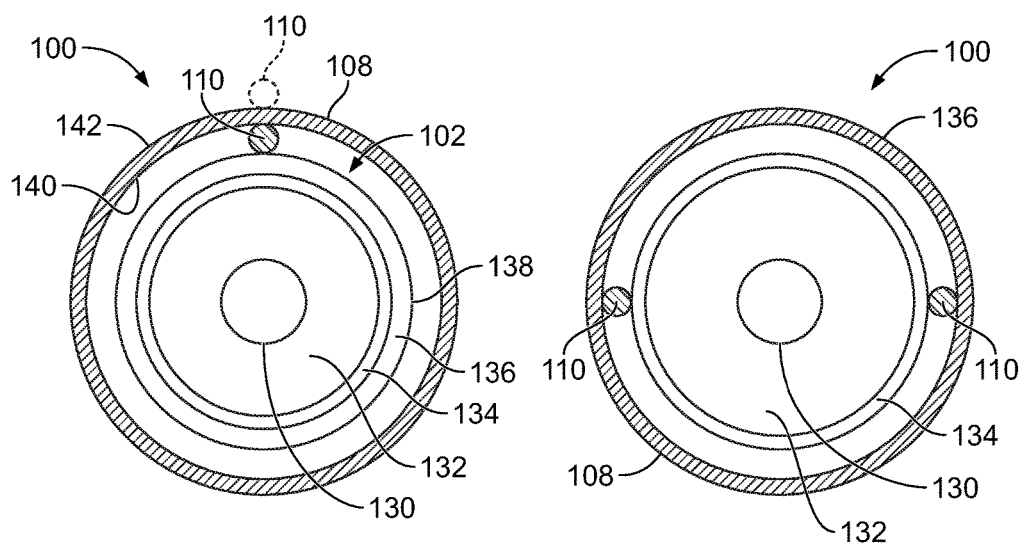
FIG. 2 is a cross-sectional view of the cable assembly in accordance with an exemplary embodiment.
FIG. 3 is a cross-sectional view of the cable assembly in accordance with an exemplary embodiment.

FIG. 2 is a cross-sectional view of the cable assembly 100 in accordance with an exemplary embodiment. The cable stiffener 110 is integrated with the cable 102 and the sleeve 108. In an exemplary embodiment, the cable 102 includes a wire 130 and an insulator 132 surrounding the wire 130. The cable 102, in the illustrated embodiment, includes a cable shield 134 surrounding the insulator 132 and a cable jacket 136 surrounding the cable shield 134.

In the illustrated embodiment, the wire 130 is a solid wire, such as a copper wire. In alternative embodiments, the wire 130 may be a stranded wire, such as including multiple copper wire strands that are braided or woven along the length of the cable 102. The wire 130 has a stiffness that defines the resistance of the wire 130 against bending deformation. While the wire 130 may have some resistance to bending deformation, typical wires and cables tend to lose shape over time and/or smooth the bends in the wire 130 along the length. For example, as the severity of the bend approaches the bend limit of the wire 130 the wire 130 is less likely to hold such a shape.

In an exemplary embodiment, the cable shield 134 is a cable braid or a tape entirely circumferentially surrounding the insulator 132 and the wire 130 to provide electrical shielding for the wire 130. The cable shield 134 is coaxial with the wire 130 and the insulator 132. The insulator 132 is manufactured from a dielectric material and has insulating properties to electrically isolate the wire 130 from the cable shield 134. The insulator 132 may be flexible to bend with the wire 130. The insulator 132 may have a stiffness less than the stiffness of the wire 130. The cable shield 134 may have a stiffness less than the stiffness of the wire 130. In other various embodiments, the cable shield 134 is or includes a drain wire extending along the length of the cable 102.

In the illustrated embodiment, the cable 102 includes the cable jacket 136. The cable stiffener 110 is outside of the cable jacket 136, such as along an outer surface 138 of the cable jacket 136. The sleeve 108 is a separate component surrounding the cable jacket 136. The sleeve 108 protects the cable 102, such as from damage to the cable 102. In alternative embodiments, rather than providing a separate sleeve 108 and cable jacket 136, the sleeve 108 may be defined by the cable jacket of the cable 102. For example, the sleeve 108 may be manufactured with the cable shield 134, the insulator 132 and the wire 130 during a cable forming process. For example, the sleeve 108 may be extruded with the wire 130, the insulator 132 and the cable shield 134 during a cable manufacturing process. Alternatively, the sleeve 108 may be applied to the cable 102 after the cable 102 is formed. In various alternative embodiments, the cable assembly 100 may include multiple cables 102 within the sleeve 108.

The sleeve 108 has an interior surface 140 facing the cable 102 and an exterior surface 142 facing an exterior environment of the cable assembly 100. In various embodiments, the sleeve 108 may be a plastic tube receiving the cable 102. In alternative embodiments, the sleeve 108 may be a woven fabric surrounding the cable 102. In other various embodiments, the sleeve 108 may be a heat shrink tube applied around the cable 102. In alternative embodiments, the sleeve 108 may be a tape wrapped around the cable 102.

The cable stiffener 110 is coupled to the sleeve 108. In an exemplary embodiment, the cable stiffener 110 is a metal wire having a stiffness greater than the stiffness of the wire 130 of the cable 102. For example, the cable stiffener 110 may be a stainless steel wire. The cable stiffener 110 has a higher resistance against bending deformation than the wire 130. The cable stiffener 110 requires higher forces to change the shape of the cable stiffener 110 than forces needed to change the shape of the wire 130. In an exemplary embodiment, the stiffness of the cable stiffener 110 is sufficient to withstand returning forces of the wire 130, which tend to return the wire 130 to the natural shape of the wire 130. As such, the wire 130 is able to retain shape and hold the wire 130 generally in the shape retaining shape of the cable stiffener 110. For example, bends may be created in the cable stiffener 110 to retain and hold the wire 130 in the bent shape. The cable stiffener 110 holds the sleeve 108, the insulator 132, the cable shield 134 and the cable jacket 136 in the shape retaining shape as well.

In an exemplary embodiment, the cable stiffener 110 is coupled to the sleeve 108 independent of the cable 102. For example, the sleeve 108 may be coupled to the cable 102 prior to coupling the cable stiffener 110 to the sleeve 108. In an exemplary embodiment, the cable stiffener 110 extends along the interior surface 140 of the sleeve 108. Additionally or alternatively, the cable stiffener 110 may extend along the exterior surface 142 (shown in phantom in FIG. 2). Alternatively, the cable stiffener 110 may be coupled to the sleeve 108 prior to coupling the sleeve 108 and the cable stiffener 110 to the cable 102. In other various embodiments, the cable stiffener 110 and the sleeve 108 may be formed with the cable 102. For example, the cable stiffener 110 and the sleeve 108 may be cabled with the wire 130, the insulator 132, the cable shield 134 and the cable jacket 136 during a cable manufacturing process.

FIG. 3 is a cross-sectional view of the cable assembly 100 in accordance with an exemplary embodiment. The cable assembly 100 is shown having multiple cable stiffeners 110, such as a pair of cable stiffeners 110 generally on opposite sides of the cable 102. Any number of cables stiffeners 110 may be provided in alternative embodiments. In the illustrated embodiment, the cable assembly 100 includes the wire 130, the insulator 132 surrounding the wire 130, the cable shield 134 surrounding the insulator 132, and the cable jacket 136 defining the sleeve 108. The cable stiffeners 110 are provided interior of the sleeve 108, such as along the cable shield 134.

Figure 4:
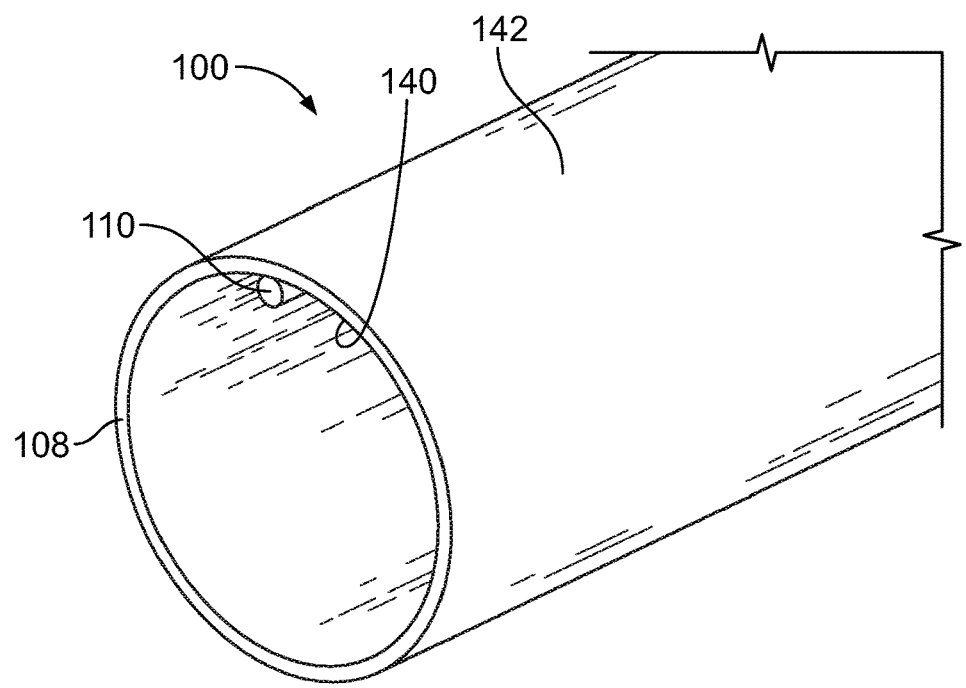
FIG. 4 is a perspective view of a portion of the cable assembly showing a sleeve and a cable stiffener in accordance with an exemplary embodiment.

FIG. 4 is a perspective view of a portion of the cable assembly 100 showing the sleeve 108 and the cable stiffener 110 provided along the interior surface 140 of the sleeve 108. In the illustrated embodiment, the sleeve 108 is a shrink covering, such as a heat shrink tube, a cold shrink covering, and the like. The heat shrink tube may be dressed over the cable 102 (shown in FIG. 2) and the cable stiffener 110. The heat shrink tube may be shrink wrapped around the cable 102 by applying heat to conform to the cable 102 and the cable stiffener 110. Optionally, the cable stiffener 110 and the cable 102 may be pre-bent prior to heat shrinking the tube. Alternatively, the heat shrink tube may be bent into shape after heat shrinking the tube.

Figure 5:
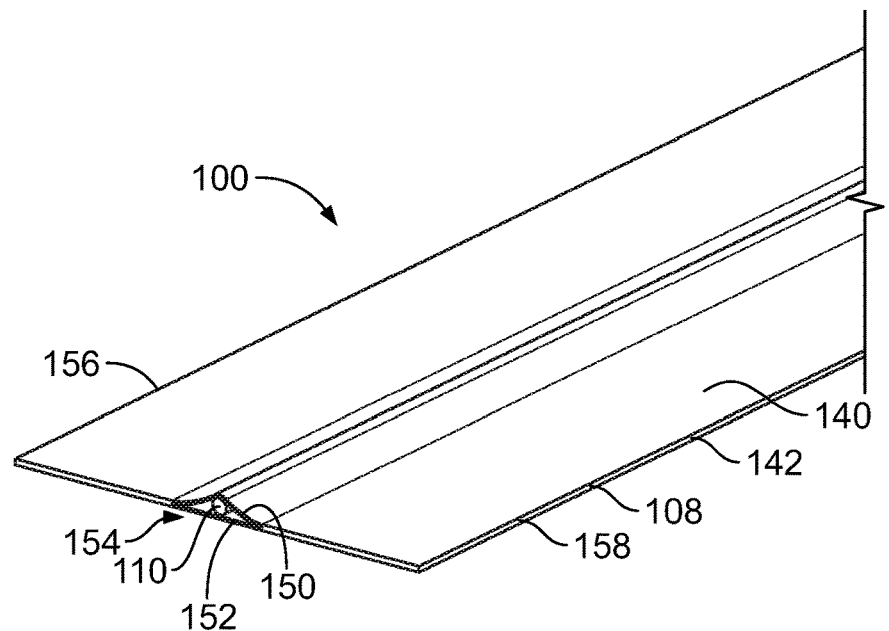
FIG. 5 is a perspective view of a portion of the cable assembly showing a sleeve and a cable stiffener in accordance with an exemplary embodiment.

FIG. 5 is a perspective view of a portion of the cable assembly 100 showing the sleeve 108 and the cable stiffener 110 in accordance with an exemplary embodiment. In the illustrated embodiment, the sleeve 108 is a tape configured to be wrapped around the cable 102 (shown in FIG. 2). The sleeve 108 includes an inner layer 150 and an outer layer 152 with a channel 154 therebetween. The cable stiffener 110 is received in the channel 154. The inner layer 150 may be adhered to the outer layer 152. In an exemplary embodiment, the tape includes a first edge 156 and a second edge 158 extending a length of the tape. The cable stiffener 110 extends parallel to the first edge 156 and the second edge 158. The cable stiffener 110 is configured to be wrapped around the cable 102 with the sleeve 108.

In an alternative embodiment, rather than locating the cable stiffener 110 in the channel 154 between the inner and outer layers 150, 152, the tape may have a single layer or multiple layers with the cable stiffener 110 along the interior surface 140 or the exterior surface 142. For example, the cable stiffener 110 may be adhered to the interior surface 140 or the exterior surface 142. In other various embodiments, the cable stiffener 110 may be applied to the cable 102 rather than the sleeve 108. For example, the cable stiffener 110 may be applied to the cable 102 and then the sleeve 108 may be wrapped around the cable 102 and the cable stiffener 110.

FIG. 6 is a perspective view of the cable assembly 100 in accordance with an exemplary embodiment. In the illustrated embodiment, the cable assembly 100 includes multiple cable stiffeners 110, such as at each of the bends 112. The cable stiffeners 110 are discontinuous and coupled to the sleeve 108, such as proximate to each of the bends 112, such as immediately upstream and downstream of the bends 112. The cable stiffeners 110 hold the cable assembly 100 in the bent shape through the bends 112.

In an exemplary embodiment, such as in the illustrated embodiment, the cable stiffeners 110 are woven into the sleeve 108. For example, the cable stiffeners 110 may extend along the interior surface 140 and the exterior surface 142 as the cable stiffeners 110 are woven through the material of the sleeve 108.

FIG. 7 is a perspective view of a portion of the cable assembly 100 in accordance with an exemplary embodiment. FIG. 7 illustrates the cable stiffener 110 woven into the sleeve 108 through the bend 112. FIG. 7 illustrates the sleeve 108 as a braided sleeve. Other types of material and construction may be used for manufacturing the sleeve 108. For example, the sleeve 108 may be an extruded plastic tube or another type of sleeve.

FIG. 8 is a cross-sectional view of the cable assembly 100 in accordance with an exemplary embodiment. FIG. 8 illustrates the cable assembly 100 having multiple cables 102 arranged within the sleeve 108. The cable stiffener 110 is used for controlling the shape of both of the cables 102 along the length of the cable assembly 100. The cables 102 may be any types of cables, such as coaxial cables as in the illustrated embodiment; however, other types of cables, such as twin-axial cables or other types of cables may be provided in alternative embodiments. The coaxial cables include the wires 130, the insulators 132, the cable shields 134 and the cable jackets 136. In other alternative embodiments, the twin-axial cable may include co-extruded wires 130 in a common insulator. In the illustrated embodiment, each of the cables 102 includes a drain wire 160. In an exemplary embodiment, the cable stiffener 110 is electrically isolated from the drain wires 160 by the cable jackets 136. The sleeve 108 surrounds both of the cables 102 and the cable stiffener 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable assembly comprising:
a cable comprising a wire and an insulator surrounding the wire, the cable extending a length between a first end and a second end, the wire being conductive, the wire having a first stiffness;
a sleeve surrounding the cable between the first end and the second end, the sleeve having an interior surface facing the cable, the sleeve having an exterior surface facing an exterior environment of the cable assembly; and
a cable stiffener coupled to the sleeve, the cable stiffener extending along at least a portion of the length of the cable, the cable stiffener being formable into a shape retaining shape, the cable stiffener having a second stiffness greater than the first stiffness to hold the cable in the shape retaining shape, wherein the cable stiffener comprises a first portion and a second portion separate and discrete from the first portion, the first portion extending along a first bend in the cable, the second portion extending along a second bend in the cable.

2. The cable assembly of claim 1, wherein the cable stiffener is a wire configured to hold the sleeve and the cable in the shape retaining shape.

3. The cable assembly of claim 1, wherein the cable stiffener is coupled to the sleeve independent of the cable.

4. The cable assembly of claim 1, wherein the cable stiffener is drawn with the sleeve and the cable during a cable manufacturing process.

5. The cable assembly of claim 1, wherein the cable stiffener is a first cable stiffener, the cable assembly comprising a second cable stiffener separate and discrete from the first cable stiffener.

6. The cable assembly of claim 1, wherein the sleeve includes an inner layer and an outer layer with a channel therebetween, the cable stiffener being received in the channel.

7. The cable assembly of claim 1, wherein the wire is a copper wire and the cable stiffener is a stainless steel wire.

8. The cable assembly of claim 1, wherein the sleeve includes braids, the cable stiffener being woven with the braids.

9. The cable assembly of claim 1, wherein the sleeve includes a tape being wrapped around the cable, the tape having a first edge and a second edge extending a length of the tape, the cable stiffener extending parallel to the first edge and the second edge and being wrapped around the cable with the tape.

10. The cable assembly of claim 1, wherein the cable comprises a cable jacket, the sleeve surrounding the cable jacket.

11. The cable assembly of claim 1, wherein the cable comprises a cable shield, the cable stiffener being electrically isolated from the cable shield.

12. The cable assembly of claim 1, wherein the conductor comprises a first conductor and the insulator comprises a first insulator, the cable further comprising a second conductor and a second insulator surrounding the second conductor, the sleeve surrounding the first and second insulators.

13. The cable assembly of claim 1, wherein the cable comprises a drain wire electrically grounded, the cable stiffener being separate and discrete from the drain wire, the cable stiffener being electrically isolated from the drain wire.

14. The cable assembly of claim 1, wherein the cable stiffener is woven into the sleeve alternatingly engaging the interior surface and the exterior surface along the length of the cable.

15. A cable assembly comprising:
a cable comprising a wire and an insulator surrounding the wire, the cable extending a length between a first end and a second end, the wire being conductive, the wire having a first stiffness;
a sleeve surrounding the cable between the first end and the second end, the sleeve having an interior surface facing the cable, the sleeve having an exterior surface facing an exterior environment of the cable assembly; and
a cable stiffener coupled to the sleeve, the cable stiffener extending along at least a portion of the length of the cable, the cable stiffener being formable into a shape retaining shape, the cable stiffener having a second stiffness greater than the first stiffness to hold the cable in the shape retaining shape, wherein the cable stiffener is woven into the sleeve alternatingly engaging the interior surface and the exterior surface along the length of the cable.

16. A cable assembly comprising:
a cable comprising a wire and an insulator surrounding the wire, the cable extending a length between a first end and a second end, the wire being conductive, the wire having a first stiffness;
a sleeve surrounding the cable between the first end and the second end, the sleeve having an interior surface facing the cable, the sleeve having an exterior surface facing an exterior environment of the cable assembly; and
a cable stiffener coupled to the sleeve, the cable stiffener extending along at least a portion of the length of the cable, the cable stiffener being formable into a shape retaining shape, the cable stiffener having a second stiffness greater than the first stiffness to hold the cable in the shape retaining shape, wherein the cable stiffener is adhered to the interior surface of the sleeve.

17. A cable assembly comprising:
a cable comprising a wire and an insulator surrounding the wire, the cable extending a length between a first end and a second end, the wire being conductive, the wire having a first stiffness;
a sleeve surrounding the cable between the first end and the second end, the sleeve having an interior surface facing the cable, the sleeve having an exterior surface facing an exterior environment of the cable assembly; and
a cable stiffener coupled to the sleeve, the cable stiffener extending along at least a portion of the length of the cable, the cable stiffener being formable into a shape retaining shape, the cable stiffener having a second stiffness greater than the first stiffness to hold the cable in the shape retaining shape, wherein the sleeve includes a heat shrink tube, the cable stiffener extending along the interior surface and the heat shrink tube being heat shrink applied to the cable stiffener and the cable.

18. A cable assembly comprising:
a cable comprising a wire and an insulator surrounding the wire, the cable extending a length between a first end and a second end, the cable having a first bend and a second bend remote from each of the first end and the second end and remote from each other, the wire being conductive, the wire having a first stiffness;
a sleeve surrounding the cable between the first end and the second end, the sleeve having an interior surface facing the cable, the sleeve having an exterior surface facing an exterior environment of the cable assembly; and
a cable stiffener coupled to the sleeve, the cable stiffener having a first portion extending along the first bend and a second portion extending along the second bend, the first portion being separate and discrete from the second portion, the cable stiffener being formable into a shape retaining shape, the cable stiffener having a second stiffness greater than the first stiffness to hold the cable in the shape retaining shape.

19. The cable assembly of claim 18, wherein the cable stiffener is a wire configured to hold the sleeve and the cable in the shape retaining shape.

20. The cable assembly of claim 18, wherein the cable stiffener is woven into the sleeve alternatingly engaging the interior surface and the exterior surface along the length of the cable.

* * * * *